(12) United States Patent
Nose et al.

(10) Patent No.: US 11,008,066 B2
(45) Date of Patent: May 18, 2021

(54) BICYCLE SHIFTING DEVICE CALIBRATION SYSTEM, BICYCLE SEATPOST CALIBRATION SYSTEM, AND BICYCLE SUSPENSION CALIBRATION SYSTEM

(71) Applicant: Shimano Inc., Osaka (JP)

(72) Inventors: Yoshitaka Nose, Osaka (JP); Takeshi Kuroiwa, Osaka (JP); Takashi Komemushi, Osaka (JP)

(73) Assignee: Shimano Inc., Osaka (JP)

( * ) Notice: Subject to any disclaimer, the term of this patent is extended or adjusted under 35 U.S.C. 154(b) by 572 days.

(21) Appl. No.: 15/804,472

(22) Filed: Nov. 6, 2017

(65) Prior Publication Data

US 2018/0208269 A1 Jul. 26, 2018

(30) Foreign Application Priority Data

Jan. 20, 2017 (JP) .............................. JP2017-008959

(51) Int. Cl.
| | |
|---|---|
| *B62M 9/122* | (2010.01) |
| *B62K 25/08* | (2006.01) |
| *B62M 25/08* | (2006.01) |
| *B62J 1/08* | (2006.01) |
| *B62J 45/40* | (2020.01) |
| *B62K 25/04* | (2006.01) |

(52) U.S. Cl.
CPC ............. *B62M 9/122* (2013.01); *B62K 25/08* (2013.01); *B62M 25/08* (2013.01); *B62J 1/08* (2013.01); *B62J 45/40* (2020.02); *B62J 2001/085* (2013.01); *B62K 2025/044* (2013.01)

(58) Field of Classification Search
CPC ........ B62M 9/12; B62M 9/121; B62M 9/122; B62M 25/08; B62K 25/08
USPC .......................................... 701/37; 180/205.1
See application file for complete search history.

(56) References Cited

U.S. PATENT DOCUMENTS

| | | | |
|---|---|---|---|
| 5,213,548 A | | 5/1993 | Colbert et al. |
| 5,651,072 A | * | 7/1997 | Nakao ................. G10K 11/178 381/71.2 |
| 2005/0087379 A1 | * | 4/2005 | Holland ................... B62M 6/60 180/206.5 |

(Continued)

FOREIGN PATENT DOCUMENTS

| | | | |
|---|---|---|---|
| JP | 2016-161364 A1 | 10/2016 | |
| KR | 20020009759 A * | 2/2002 | .............. B62M 6/75 |

(Continued)

*Primary Examiner* — Isaac G Smith
(74) *Attorney, Agent, or Firm* — Global IP Counselors, LLP

(57) ABSTRACT

A bicycle shifting device calibration system, a bicycle seatpost calibration system and a bicycle suspension calibration system are provided that allow for easy setting of a shifting position or an actuation parameter. The bicycle shifting device calibration system includes an electronic controller and a memory. The electronic controller sets a plurality of shifting positions related to a shifting device based on vibration information that is output from a vibration detector in a case where a movable portion of the shifting device is continuously moved from a first position to a second position, which differs from the first position, in a state where the shifting device is coupled to a bicycle. The memory stores the plurality of shifting positions set by the electronic controller.

30 Claims, 9 Drawing Sheets

(56) References Cited

U.S. PATENT DOCUMENTS

| | | | | |
|---|---|---|---|---|
| 2014/0074348 A1* | 3/2014 | Kitamura | .............. | G01L 25/006 701/33.1 |
| 2016/0288877 A1* | 10/2016 | Goates | ................... | B62M 9/122 |
| 2017/0233037 A1* | 8/2017 | Hara | ........................ | B62M 9/10 474/78 |

FOREIGN PATENT DOCUMENTS

| | | |
|---|---|---|
| TW | 201332837 A | 8/2013 |
| TW | 201504107 A | 2/2015 |
| TW | 201604066 A | 2/2016 |

\* cited by examiner

BICYCLE SHIFTING DEVICE CALIBRATION SYSTEM, BICYCLE SEATPOST CALIBRATION SYSTEM, AND BICYCLE SUSPENSION CALIBRATION SYSTEM

CROSS-REFERENCE TO RELATED APPLICATIONS

This application claims priority to Japanese Patent Application No. 2017-008959, filed on Jan. 20, 2017. The entire disclosure of Japanese Patent Application No. 2017-008959 is hereby incorporated herein by reference.

BACKGROUND

Field of the Invention

The present invention relates to a bicycle shifting device calibration system, a bicycle seatpost calibration system, and a bicycle suspension calibration system.

Background Information

A conventional bicycle shifting device calibration system calculates an adjustment amount of a shifting device based on a feedback signal that is output from a vibration detector in a case where the driver operates a shift operating device to move a movable portion of the shifting device from a first position to a second position, which differs from the first position. One example of a conventional bicycle shifting device calibration system is disclosed in International Patent Publication No. WO2016/161364A1 (Patent Document 1).

SUMMARY

It is preferred that the shifting position of a shifting device be easily set. It is also preferred that actuation parameters of a bicycle seatpost and a bicycle suspension be easily set. It is an object of the present invention to provide a bicycle shifting device calibration system, a bicycle seatpost calibration system, and a bicycle suspension calibration system that allow for easy setting of a shifting position or an actuation parameter.

In accordance with a first aspect of the present invention, a bicycle shifting device calibration system includes a controller that sets a plurality of shifting positions related to a shifting device based on vibration information that is output from a vibration detector in a case where a movable portion of the shifting device is continuously moved from a first position to a second position, which differs from the first position, in a state where the shifting device is coupled to a bicycle and a memory that stores the plurality of shifting positions set by the electronic controller. The plurality of shifting positions is set based on the vibration information. Thus, the shifting positions of the shifting device can be easily set.

In accordance with a second aspect of the present invention, the bicycle shifting device calibration system according to the first aspect further includes the vibration detector that detects a vibration in a case where the movable portion of the shifting device is actuated. Thus, the shifting positions are accurately set.

In accordance with a third aspect of the present invention, in the bicycle shifting device calibration system according to the second aspect, the vibration detector detects vibration of air. Thus, the vibration is accurately detected in a case where the movable portion of the shifting device is actuated.

In accordance with a fourth aspect of the present invention, in the bicycle shifting device calibration system according to the third aspect, the vibration detector includes a microphone. Thus, the vibration is accurately detected in a case where the movable portion of the shifting device is actuated.

In accordance with a fifth aspect of the present invention, in the bicycle shifting device calibration system according to the second aspect, the vibration detector directly or indirectly detects at least one of a vibration of a bicycle body to which the shifting device is coupled, a vibration of a bicycle sprocket assembly, a vibration of a bicycle chain that runs around the bicycle sprocket assembly, and a vibration of the shifting device. Thus, the vibration is accurately detected in a case where the movable portion of the shifting device is actuated.

In accordance with a sixth aspect of the present invention, in the bicycle shifting device calibration system according to the second or fifth aspect, the vibration detector includes a vibration sensor. The vibration sensor is not easily affected by noise. Thus, the vibration is accurately detected in a case where the movable portion of the shifting device is actuated.

In accordance with a seventh aspect of the present invention, in the bicycle shifting device calibration system according to any one of the first to sixth aspects, the electronic controller sets the shifting positions of five or more stages related to the shifting device based on the vibration information. Thus, a number of shifting positions can be set.

In accordance with an eighth aspect of the present invention, in the bicycle shifting device calibration system according to the seventh aspect, the electronic controller sets the shifting positions of ten or more stages related to the shifting device based on the vibration information. Thus, a greater number of shifting positions can be set.

In accordance with a ninth aspect of the present invention, in the bicycle shifting device calibration system according to any one of the first to eighth aspects, the shifting device is a derailleur that changes an engagement state between a bicycle sprocket assembly and a bicycle chain. Thus, the shifting positions of the derailleur are easily set.

In accordance with a tenth aspect of the present invention, in the bicycle shifting device calibration system according to the ninth aspect, the bicycle sprocket assembly includes a first sprocket that has a smallest outer diameter and a second sprocket that has a largest outer diameter, and the plurality of shifting positions includes a first shifting position that corresponds to the first sprocket and a second shifting position that corresponds to the second sprocket. Thus, a number of shifting positions can be set.

In accordance with an eleventh aspect of the present invention, in the bicycle shifting device calibration system according to the tenth aspect, the first position corresponds to one of the first shifting position and the second shifting position, and the second position corresponds to the other one of the first shifting position and the second shifting position. Thus, the vibration is accurately detected in a case where the movable portion of the shifting device is actuated.

In accordance with a twelfth aspect of the present invention, in the bicycle shifting device calibration system according to the tenth or eleventh aspect, the first shifting position and the second shifting position are spaced apart by a distance of 10 mm or greater in an axial direction that is parallel to a rotational center axis of the bicycle sprocket assembly. Thus, a number of shifting positions can be set.

In accordance with a thirteenth aspect of the present invention, in the bicycle shifting device calibration system according to any one of the tenth to twelfth aspects, the first shifting position and the second shifting position are spaced apart by a distance of 50 mm or less in an axial direction that is parallel to a rotational center axis of the bicycle sprocket assembly. Thus, a number of shifting positions can be set.

In accordance with a fourteenth aspect of the present invention, the bicycle shifting device calibration system according to any one of the first to thirteenth aspects further includes an external terminal that includes the electronic controller. The plurality of shifting positions of the shifting device can be set by operating the external terminal. This increases the convenience.

In accordance with a fifteenth aspect of the present invention, in the bicycle shifting device calibration system according to the fourteenth aspect, the external terminal has a guide function that guides a range in which the vibration detector is able to detect vibration. Thus, the vibration is accurately detected in a case where the movable portion of the shifting device is actuated.

In accordance with a sixteenth aspect of the present invention, the bicycle shifting device calibration system according to any one of the first to thirteenth aspects further includes an external terminal that includes the vibration detector. The plurality of shifting positions of the shifting device can be set by operating the external terminal. This increases the convenience.

In accordance with a seventeenth aspect of the present invention, in the bicycle shifting device calibration system according to the sixteenth aspect, the vibration detector connects and communicates with a vibration sensor that directly or indirectly detects at least one of a vibration of a bicycle body to which the shifting device is coupled, a vibration of a bicycle sprocket assembly, a vibration of a bicycle chain that runs around the bicycle sprocket assembly, and a vibration of the shifting device. Thus, the plurality of shifting positions of the shifting device can be set by operating the external terminal.

In accordance with an eighteenth aspect of the present invention, in the bicycle shifting device calibration system according to any one of the first to seventeenth aspects, the shifting device includes a first electric actuator that actuates the movable portion. Thus, the actuation of the movable portion can be electrically controlled.

In accordance with a nineteenth aspect of the present invention, the bicycle shifting device calibration system according to any one of the first to eighteenth aspects further includes a second electric actuator that moves a bicycle chain, which transmits drive power to a rear wheel of the bicycle. The fixed rotation speed of the chain is maintained by controlling the second electric actuator. Thus, the vibration is further accurately detected in a case where the movable portion of the shifting device is actuated.

In accordance with a twentieth aspect of the present invention, in the bicycle shifting device calibration system according to any one of the first to nineteenth aspects, the electronic controller sets the plurality of shifting positions while executing a calibration mode. Thus, the time required for setting the plurality of shifting positions is shortened.

In accordance with a twenty-first aspect of the present invention, in the bicycle shifting device calibration system according to the nineteenth aspect, the electronic controller actuates the second electric actuator while executing a calibration mode. Thus, the second electric actuator is accurately actuated to detect the vibration in a case where the movable portion of the shifting device is actuated.

In accordance with a twenty-second aspect of the present invention, in the bicycle shifting device calibration system according to the twenty-first aspect, the electronic controller continuously moves the movable portion from the first position to the second position and sets the plurality of shifting positions based on the vibration information while actuating the second electric actuator. The movable portion is continuously moved from the first position to the second position. Thus, the vibration is accurately detected in a case where the movable portion of the shifting device is actuated.

In accordance with a twenty-third aspect of the present invention, in the bicycle shifting device calibration system according to the twenty-second aspect, the electronic controller deactuates the second electric actuator in a case where the plurality of shifting positions are set. Thus, power consumption of the second electric actuator is reduced.

In accordance with a twenty-fourth aspect of the present invention, in the bicycle shifting device calibration system according to any one of the twenty-first to twenty-third aspects, the electronic controller does not actuate the second electric actuator in a case where the bicycle is not traveling and the calibration mode is not executed. Thus, while the bicycle is not travelling, the actuation of the second electric actuator is prevented for a purpose other than the purpose for setting the shifting positions in the calibration mode.

In accordance with a twenty-fifth aspect of the present invention, in the bicycle shifting device calibration system according to any one of the twentieth to twenty-fourth aspects, the electronic controller does not execute the calibration mode in a state where a rear wheel of the bicycle is in contact with ground. Thus, changes in the shifting positions are avoided under a condition in which there is the possibility that the bicycle is traveling.

In accordance with a twenty-sixth aspect of the present invention, in the bicycle shifting device calibration system according to any one of the twentieth to twenty-fifth aspects, the electronic controller does not execute the calibration mode in a case where an inclination angle of a bicycle body with respect to a pitch axis is less than or equal to a predetermined angle. Thus, changes in the shifting positions are avoided under a condition in which there is the possibility that the bicycle is traveling.

In accordance with a twenty-seventh aspect of the present invention, in the bicycle shifting device calibration system according to any one of the twentieth to twenty-sixth aspects, the electronic controller does not execute the calibration mode in a case where a level of noise related to vibration detected by the vibration detector is greater than or equal to a fixed value. Thus, the shifting positions are accurately set.

In accordance with a twenty-eighth aspect of the present invention, in the bicycle shifting device calibration system according to any one of the first to twenty-seventh aspects, the electronic controller sets the plurality of shifting positions based on the vibration information that is output from the vibration detector in a case where the movable portion is continuously moved in order from the first position to the second position and then the first position. The movable portion is reciprocated. Thus, the shifting positions are further accurately set.

In accordance with a twenty-ninth aspect of the present invention, in the bicycle shifting device calibration system according to any one of the first to twenty-eighth aspects, the electronic controller continuously moves the movable portion from the first position to the second position at a fixed speed that is set in advance. Thus, the vibration is accurately detected in a case where the movable portion of the shifting device is actuated.

In accordance with a thirtieth aspect of the present invention, a bicycle seatpost calibration system includes a controller that sets at least one actuation parameter related to an electric seatpost based on vibration information that is output from a vibration detector in a case where a movable portion of the electric seatpost is moved from a first position to a second position that differs from the first position and a memory that stores the actuation parameter set by the electronic controller. Thus, the actuation parameter is easily set.

In accordance with a thirty-first aspect of the present invention, a bicycle suspension calibration system includes a controller that sets at least one actuation parameter related to an electric suspension based on vibration information that is output from a vibration detector in a case where a movable portion of the electric suspension is moved from a first position to a second position that differs from the first position and a memory that stores the actuation parameter set by the electronic controller. Thus, the actuation parameter is easily set.

The bicycle shifting device calibration system, the bicycle seatpost calibration system, and the bicycle suspension calibration system of the present invention allow for easy setting of the shifting position, the support position, or the actuation position.

BRIEF DESCRIPTION OF THE DRAWINGS

Referring now to the attached drawings which form a part of this original disclosure.

DETAILED DESCRIPTION OF EMBODIMENTS

The following description illustrates embodiments of a bicycle shifting device calibration system, a bicycle seatpost calibration system, and a bicycle suspension calibration system according to the present invention and is not intended to be restrictive. The embodiments of the bicycle shifting device calibration system, the bicycle seatpost calibration system, and the bicycle suspension calibration system according to the present invention can be modified. Further, two or more of the modified examples can be combined.

In the following description of each embodiment, the terms expressing directions such as front, rear, frontward, rearward, left, right, side, up, and down are used based on the frame of reference that is the user seated in a saddle A6 of a bicycle A and facing a handlebar A2.

Figure 1:
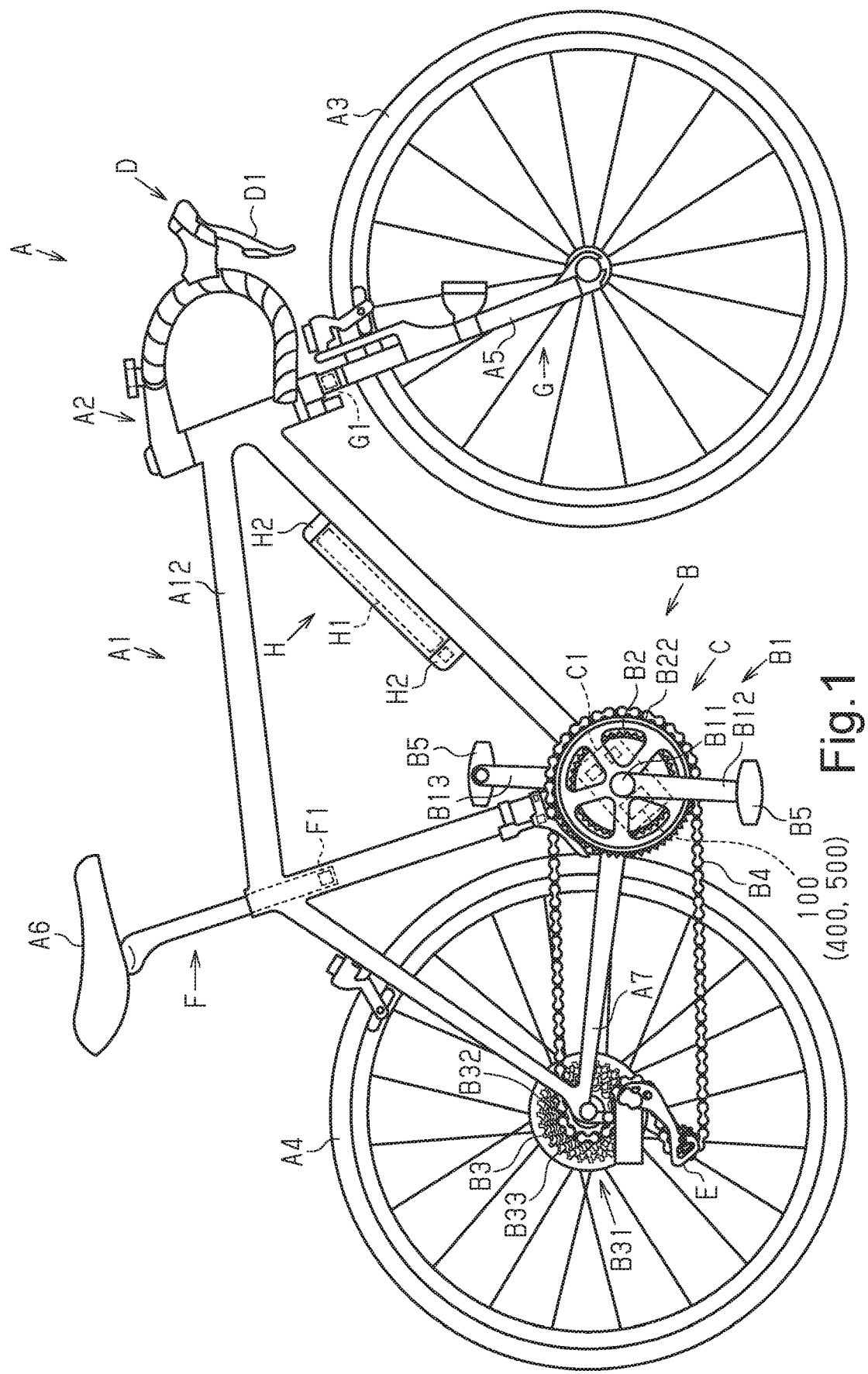
FIG. 1 is a side elevational view of a bicycle equipped with a bicycle shifting device calibration system, a bicycle seatpost calibration system and a bicycle suspension calibration system in accordance with illustrative embodiments.

FIG. 1 is one example of the bicycle A, which is the subject to which a bicycle shifting device calibration system 10 (refer to FIG. 4) is applied. The bicycle A is a city bike that includes an assist mechanism C, which assists propulsion of the bicycle A using electrical energy. The configuration of the bicycle A can be changed. In a first example, the bicycle A does not include the assist mechanism C. In a second example, the type of the bicycle A is a road bike, a mountain bike, or a hybrid bike. In a third example, the bicycle A includes the aspects of the first example and the second example.

As shown in FIG. 1, the bicycle A includes a bicycle body A1, the handlebar A2, a front wheel A3, a rear wheel A4, a front fork A5, the saddle A6, a drive mechanism B, the assist mechanism C, a shift operating device D, a shifting device E, an electric seatpost F, an electric suspension G, a battery unit H and an electronic control unit 100. The bicycle A further includes a torque sensor and a vehicle speed sensor (not shown). The bicycle body A1 includes a frame A12.

The drive mechanism B transmits manual (human) power to the rear wheel A4 with a chain drive, a belt drive, or a shaft drive. FIG. 1 shows an example of the drive mechanism B that includes a chain drive. The drive mechanism B includes a crank B1, a first bicycle sprocket assembly B2, a second bicycle sprocket assembly B3, a bicycle chain B4 and two pedals B5.

The crank B1 includes a crankshaft B11, a right crank B12 and a left crank B13. The crankshaft B11 is rotatably supported by a bottom bracket arranged on the frame A12. Each of the right crank B12 and the left crank B13 is coupled to the crankshaft B11. One of the two pedals B5 is rotatably supported by the right crank B12. The other one of the two pedals B5 is rotatably supported by the left crank B13.

The first bicycle sprocket assembly B2, which has a first rotational center axis (not shown), is coupled to the crankshaft B11 so as to be rotatable integrally with the crankshaft B11. The first bicycle sprocket assembly B2 includes one or more sprockets B22. The crankshaft B11 has a rotational center axis that is coaxial with the rotational center axis of the first bicycle sprocket assembly B2.

Figure 3:
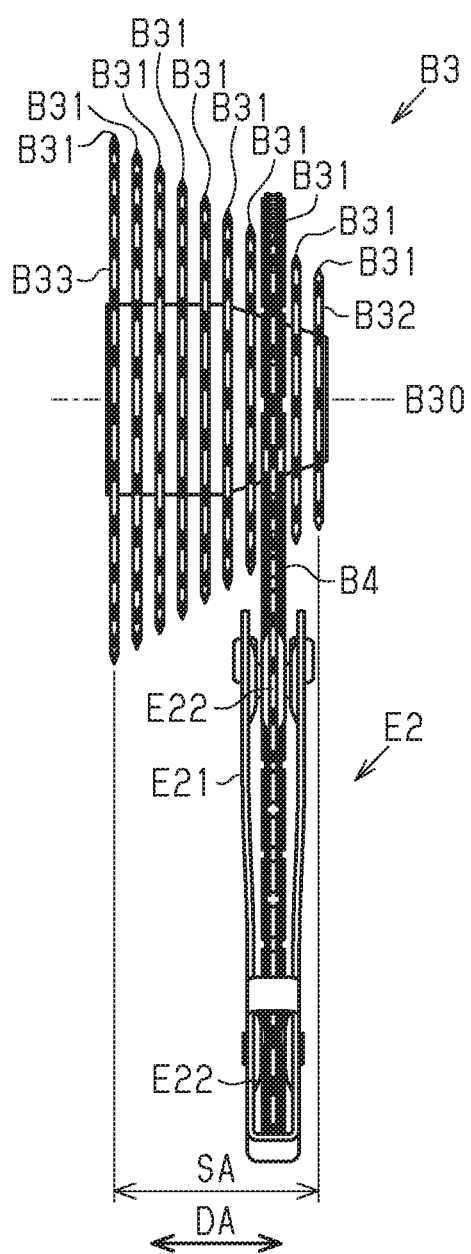
FIG. 3 is a rear end side view of a portion of the shifting device of FIG. 2 and its surroundings.

The second bicycle sprocket assembly B3 has a rotational center axis B30 (refer to FIG. 3). The second bicycle sprocket assembly B3 is rotatably supported by a hub (not shown) of the rear wheel A4. The second bicycle sprocket assembly B3 includes one or more sprockets B31. In one example, the second bicycle sprocket assembly B3 includes a plurality of sprockets B31 having different outer diameters. The second bicycle sprocket assembly B3 includes a first sprocket B32 and a second sprocket B33. The first sprocket B32 has the smallest outer diameter among the plurality of sprockets B31. The second sprocket B33 has the largest outer diameter among the plurality of sprockets B31. The number of teeth in each sprocket B31 can be selected from any number. For example, the number of teeth in the first sprocket B32 can be less than or equal to a first predetermined number of teeth. In one example, the first predetermined number of teeth is ten. The number of teeth in the second sprocket B33 can be greater than or equal to a second predetermined number of teeth. In one example, the second predetermined number of teeth is forty-four. In a preferred example, the difference between the number of teeth in the second sprocket B33 and the number of teeth in the first sprocket B32 (hereafter, referred to as "the teeth count difference") is greater than or equal to a predetermined teeth count difference. In one example, the predetermined teeth count difference is twenty-five or thirty-five.

In a preferred example, the distance between a first shifting position and a second shifting position (hereafter, referred to as "the inter-shifting-position distance SA" (refer to FIG. 3)) is greater than or equal to a first predetermined distance and less than or equal to a second predetermined distance in an axial direction DA, which is parallel to the rotational center axis B30 of the second bicycle sprocket assembly B3. One example of the first predetermined distance is 10 mm. One example of the second predetermined distance is 50 mm. In a preferred example, the inter-shifting-position distance SA is greater than or equal to 10 mm and less than or equal to 50 mm.

As shown in FIG. 1, the bicycle chain B4 runs around one of the sprockets B22 of the first bicycle sprocket assembly B2 and one of the sprockets B31 of the second bicycle sprocket assembly B3. In a case where human power is applied to the two pedals B5 to forwardly rotate the crank B1, the first bicycle sprocket assembly B2 is forwardly rotated together with the crank B1. The rotation of the first bicycle sprocket assembly B2 is transmitted to the second bicycle sprocket assembly B3 through the bicycle chain B4 to forwardly rotate the rear wheel A4.

The assist mechanism C includes a second electric actuator C1. The assist mechanism C assists propulsion of the bicycle A. In one example, the assist mechanism C transmits torque to the first bicycle sprocket assembly B2 to assist propulsion of the bicycle A. The second electric actuator C1 is, for example, an electric motor. The second electric actuator C1 moves the bicycle chain B4, which transmits drive power to the rear wheel A4 of the bicycle A.

The shift operating device D includes an operating portion D1, which the user operates. One example of the operating portion D1 is one or more buttons. The shift operating device D connects and communicates with the shifting device E so that a signal corresponding to an operation of the operating portion D1 is transmitted to the shifting device E. In a first example, the shift operating device D is connected by a wire allowing for power line communication (PLC) or a communication line to communicate with the shifting device E. In a second example, the shift operating device D is connected by a wireless communication unit, which is configured to perform wireless communication, to communicate with the shifting device E. In a case where the operating portion D1 is operated, a signal for changing the shifting stage of the shifting device E is transmitted to the shifting device E. The shifting device E is actuated in accordance with the signal to change the shifting stage.

The shifting device E can be of various types. In a first example, the shifting device E is a derailleur that changes the engagement state between the second bicycle sprocket assembly B3 and the bicycle chain B4. More specifically, the shifting device E changes which one of the sprockets B31 that is engaged with the bicycle chain B4 to change the ratio of the number of rotations of the rear wheel A4 to the number of rotations of the crank B1, that is, the transmission ratio of the bicycle A. The shifting device E has a plurality of shifting stages respectively corresponding to the sprockets B31. The transmission ratio is changed in accordance with the selected shifting stage. The shifting device E moves the bicycle chain B4 to change the shifting stage. Accordingly, the transmission ratio is changed. The first example of the shifting device E is coupled to a derailleur hanger A7 of the bicycle A. In a second example, the shifting device E is an internal shifting device. In the second example, the shifting device E includes a movable portion that includes at least one of a sleeve and pawl of the internal shifting device.

Figure 2:
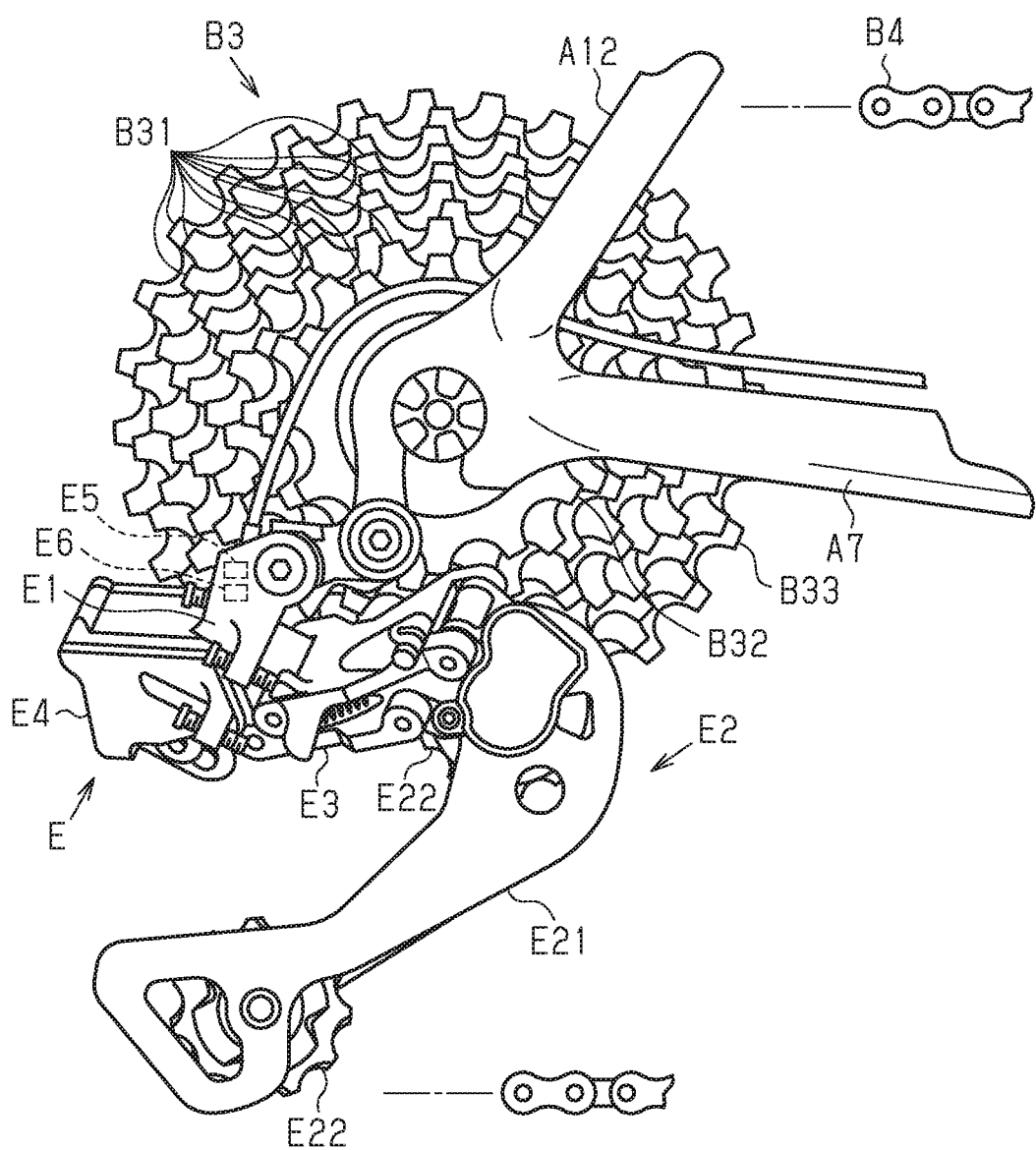
FIG. 2 is a side elevational view showing a shifting device of FIG. 1 and its surroundings.

As shown in FIG. 2, the present embodiment of the shifting device E includes a base E1, a movable portion E2, a link E3, a first electric actuator E4, an inclination sensor E5 and a position sensor E6.

The base E1 is coupled to the derailleur hanger A7 arranged on the frame A12. The movable portion E2 is arranged to be movable relative to the base E1. The movable portion E2 rotatably supports a chain guide E21. The chain guide E21 includes two pulleys E22. The bicycle chain B4 runs around the two pulleys E22. The link E3 connects the movable portion E2 to the base E1 so that the movable portion E2 is movable relative to the base E1.

The first electric actuator E4 is, for example, an electric motor. The first electric actuator E4 actuates the movable portion E2. In the shifting device E, the movable portion E2 is actuated by the first electric actuator E4 to change the bicycle chain B4 between the sprockets B31. Accordingly, the transmission ratio is changed.

The inclination sensor E5 connects and communicates with the electronic control unit 100 (refer to FIG. 1). The inclination sensor E5 is arranged on the base E1. In one example, the inclination sensor E5 includes a gyroscope. The position sensor E6 connects and communicates with the electronic control unit 100. The position sensor E6 is arranged on the base E1 to detect the position of the movable portion E2 relative to the base E1. In one example, the position sensor E6 includes a magnetic sensor.

The electric seatpost F is coupled to the frame A12. The electric seatpost F includes an electric actuator F1. The electric actuator F1 lifts and lowers the saddle A6 relative to the frame A12. The electric actuator F1 is, for example, an electric motor. The electric seatpost F is configured so that the support position of the saddle A6 relative to the frame A12 is settable as an actuation parameter. The support position of the saddle A6 includes one or more support positions.

The electric suspension G can be of various types. In the present embodiment, the electric suspension G is a front suspension that is arranged on the front fork A5 to damp a shock applied to the front wheel A3. The electric suspension G includes an electric actuator G1. The electric actuator G1 is, for example, an electric motor. The electric suspension G is configured so that a damping rate, a stroke amount, and a lockout state are settable as actuation parameters. The electric suspension G can change the actuation parameters by driving the electric actuator G1. The electric suspension G can be a rear suspension that damps a shock applied to the rear wheel A4.

The battery unit H includes a battery H1 and a battery holder H2. The battery H1 is a storage battery that includes one or more battery cells. The battery holder H2 is fixed to the frame A12 of the bicycle A. The battery H1 is attachable to and removable from the battery holder H2. The battery holder H2 is electrically connected to at least each of the first electric actuator E4 and the second electric actuator C1. In a case where the battery H1 is attached to the battery holder H2, the battery H1 is electrically connected to at least each of the first electric actuator E4 and the second electric actuator C1. The battery H1 can be electrically connected to each of the electric actuator F1 of the electric seatpost F and the electric actuator G1 of the electric suspension G.

The electronic control unit 100 includes an electronic controller 110 and a memory 120. The electronic control unit 100 further includes a speed sensor 130. The electronic control unit 100 connects and communicates with each of the shifting device E and the assist mechanism C so as to control at least the shifting device E and the assist mechanism C. In a first example, the electronic control unit 100 is connected by a wire allowing for PLC or a communication line to communicate with at least one of the shifting device E and the assist mechanism C. In a second example, the electronic control unit 100 is connected by a wireless communication unit configured to perform wireless communication to communicate with at least one of the shifting device E and the assist mechanism C. The memory 120 can be arranged separately from the electronic controller 110. More specifically, the memory 120 can be included in the shifting device E. The speed sensor 130 detects the traveling speed of the bicycle A.

In a state where the shifting device E is coupled to the bicycle A, if the movable portion E2 of the shifting device E is continuously moved from a first position to a second position that differs from the first position based on an instruction of an external terminal 200, which will be described later, the electronic controller 110 executes a calibration mode that sets a plurality of shifting positions related to the shifting device E based on vibration information that is output from a vibration detector 300. The first position is the position corresponding to one of the first shifting position and the second shifting position. The second position is the position corresponding to the other one of the first shifting position and the second shifting position. The first shifting position is the shifting position corresponding to, for example, the first sprocket B32 (refer to FIG. 2). The second shifting position is the shifting position corresponding to, for example, the second sprocket B33 (refer to FIG. 2).

In the present embodiment, the electronic controller 110 sets the plurality of shifting positions based on information from the external terminal 200 while executing the calibration mode. In a first example, the electronic controller 110 sets the plurality of shifting positions based on vibration information that is output from the vibration detector 300 in a case where the movable portion E2 is continuously moved in order from the first position to the second position and then the first position. In a second example, the electronic controller 110 sets the plurality of shifting positions based on vibration information that is output from the vibration detector 300 in a case where the movable portion E2 is continuously moved in order from the second position to the first position and then the second position. In a third example, the electronic controller 110 sets the plurality of shifting positions based on vibration information that is output from the vibration detector 300 in a case where the movable portion E2 is continuously moved from one of the first position and the second position to the other one of the first position and the second position. The electronic controller 110 can set any number of shifting positions. In a first example, the electronic controller 110 sets the shifting positions of five or more stages related to the shifting device E. In a second example, the electronic controller 110 sets the shifting positions of ten or more stages related to the shifting device E. The electronic controller 110 actuates the second electric actuator C1 while executing the calibration mode. The electronic controller 110 is configured not to actuate the second electric actuator C1 while the bicycle A is not traveling. The electronic controller 110 can be configured not to actuate the second electric actuator C1 in a case where the bicycle A is not traveling and the calibration mode is not executed. Additionally, the electronic controller 110 can be configured not to execute the calibration mode in a case where the level of noise related to the vibration detected by the vibration detector 300 is greater than or equal to a fixed value. The electronic controller 110 can be configured not to execute the calibration mode in a state where the rear wheel A4 of the bicycle A is in contact with the ground. The electronic controller 110 can be configured not to execute the calibration mode in a case where the inclination angle of the bicycle body A1 (hereafter, referred to as "the bicycle inclination angle") with respect to the pitch axis is less than or equal to a predetermined angle. The memory 120 stores the plurality of shifting positions, which is set by the electronic controller 110. The memory 120 is any computer storage device or any computer readable medium with the sole exception of a transitory, propagating signal. For example, the memory 120 can be nonvolatile memory and volatile memory, and can includes a ROM (Read Only Memory) device, a RAM (Random Access Memory) device, a hard disk, a flash drive, etc.

Figure 4:
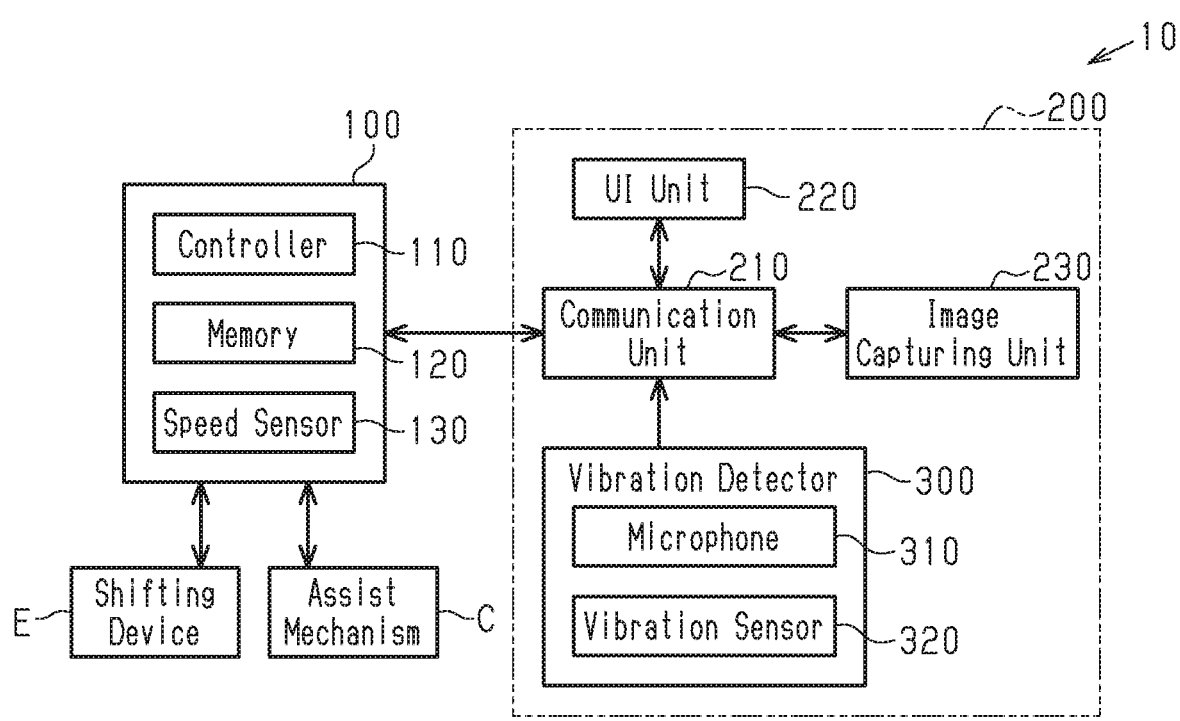
FIG. 4 is a block diagram showing the configuration of the bicycle shifting device calibration system.

As shown in FIG. 4, the bicycle shifting device calibration system 10 includes the electronic control unit 100, the external terminal 200 and the vibration detector 300. The bicycle shifting device calibration system 10 can also further include the drive mechanism B, the shifting device E and the assist mechanism C. In the present embodiment, the external terminal 200 includes a communication unit 210, a user interface unit 220 (hereafter, referred to as "the UI unit 220") and an image capturing unit 230. In the present embodiment, the vibration detector 300 is included in the external terminal 200.

In the present embodiment, one example of the external terminal 200 is a smartphone or a tablet terminal. The communication unit 210 includes a wireless communication unit (not shown). The wireless communication unit connects and communicates with the electronic controller 110. The UI unit 220 is a portion operated by the user to start to execute the calibration mode. In the present embodiment, the UI unit 220 is a smartphone or a touchscreen display of a tablet terminal. One example of the image capturing unit 230 is a camera of a smartphone or a camera of a tablet terminal.

The vibration detector 300 detects vibration in a case where the movable portion E2 (refer to FIG. 2) of the shifting device E is moved. The vibration detector 300 directly or indirectly detects at least one of vibration of the bicycle body A1 to which the shifting device E is coupled, a vibration of the second bicycle sprocket assembly B3, a vibration of the bicycle chain B4 that runs around the second bicycle sprocket assembly B3, and a vibration of the shifting device E. The vibration detector 300 can be of various types. In one example, the vibration detector 300 includes a sensor that detects vibration of air. More specifically, the vibration detector 300 includes a microphone 310. In this case, the vibration detector 300 indirectly detects at least one of a vibration of the bicycle body A1 to which the shifting device E is coupled, a vibration of the second bicycle sprocket assembly B3, a vibration of the bicycle chain B4 that runs around the second bicycle sprocket assembly B3, and a vibration of the shifting device E through the air.

In another example, the vibration detector 300 includes a vibration sensor 320 that can be coupled to the bicycle body A1. In this case, the vibration detector 300 directly detects at least one of vibration of the bicycle body A1 to which the shifting device E is coupled, a vibration of the second bicycle sprocket assembly B3, a vibration of the bicycle chain B4 that runs around the second bicycle sprocket assembly B3, and a vibration of the shifting device E.

The vibration detector 300 can include at least one or both of the microphone 310 and the vibration sensor 320. In the present embodiment, it is preferred that the vibration detector 300 include at least the microphone 310.

In the present embodiment, the vibration detector 300 is incorporated in the external terminal 200. Instead, the vibration detector 300 can be incorporated in the electronic control unit 100 or the shifting device E. Alternatively, the vibration detector 300 can be coupled to the frame A1.

The external terminal 200 has a guide function that guides the range in which the vibration detector 300 is able to detect vibration. One example of the guide function is an augmented reality (AR) camera application that runs in the external terminal 200. The guide function will be described later.

Figure 5:
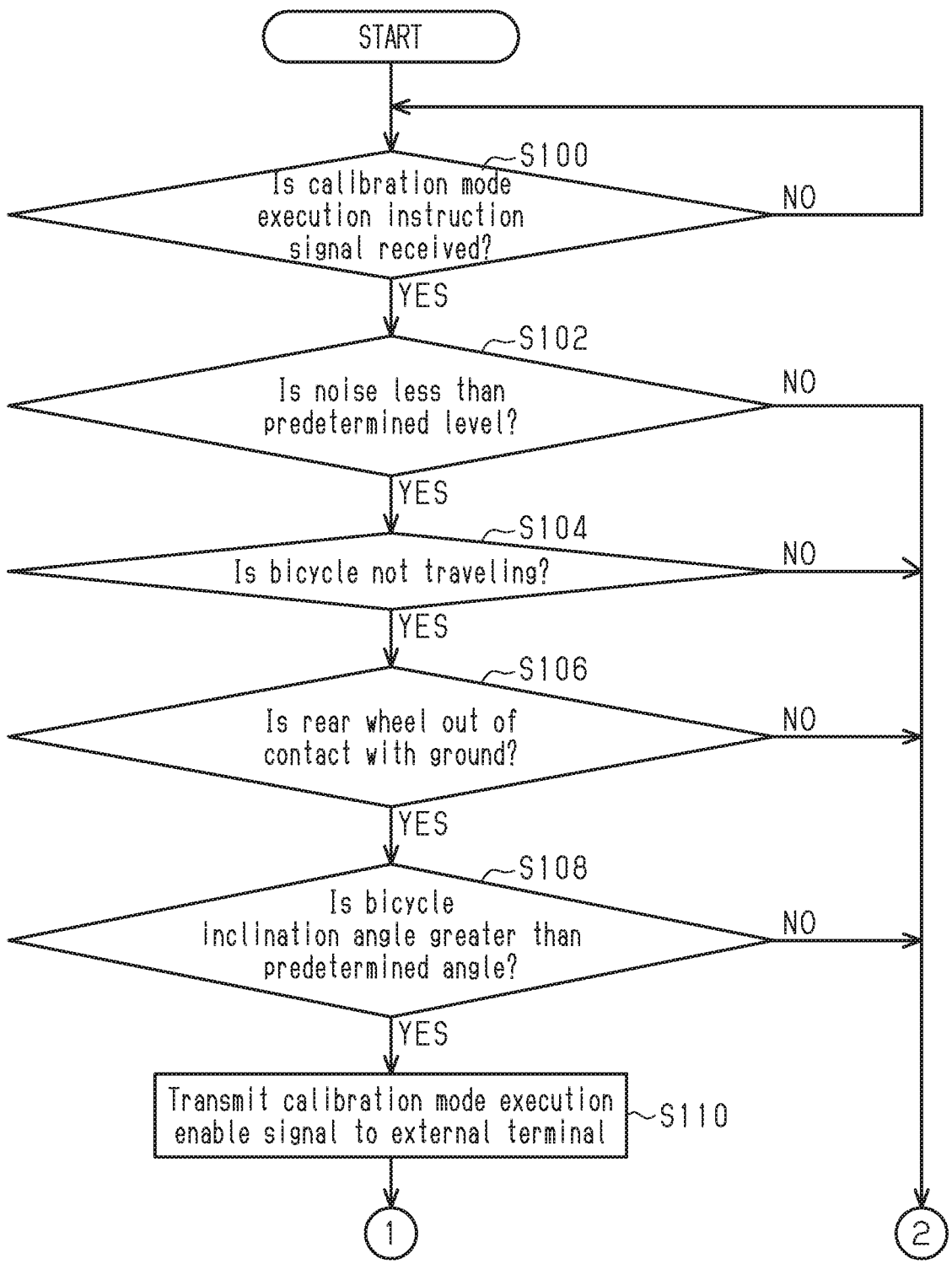
FIG. 5 is a flowchart showing one example of an action of an electronic controller in a calibration mode.
Figure 6:
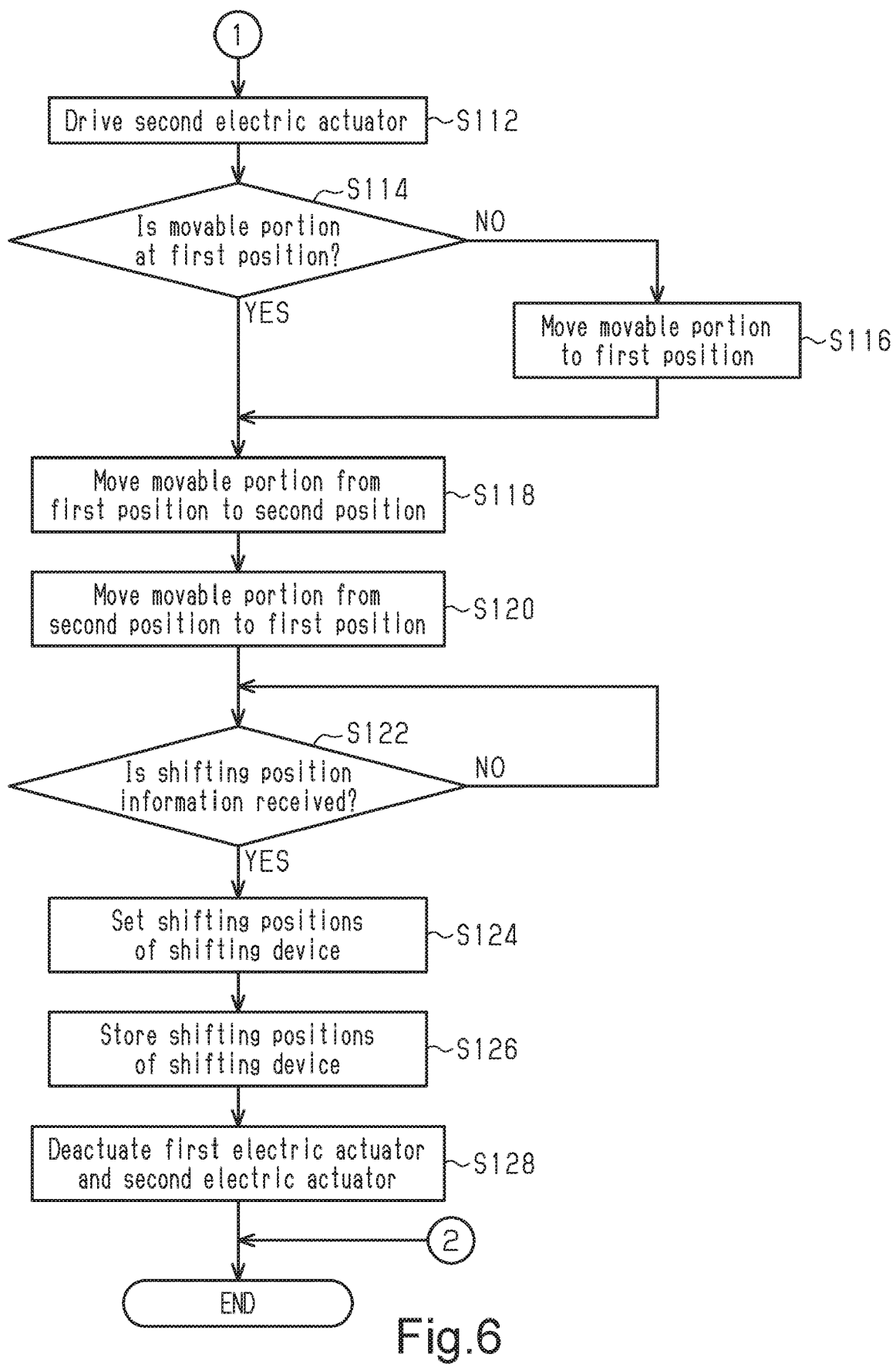
FIG. 6 is a flowchart showing one example of an action of the electronic controller in the calibration mode.
Figure 7:
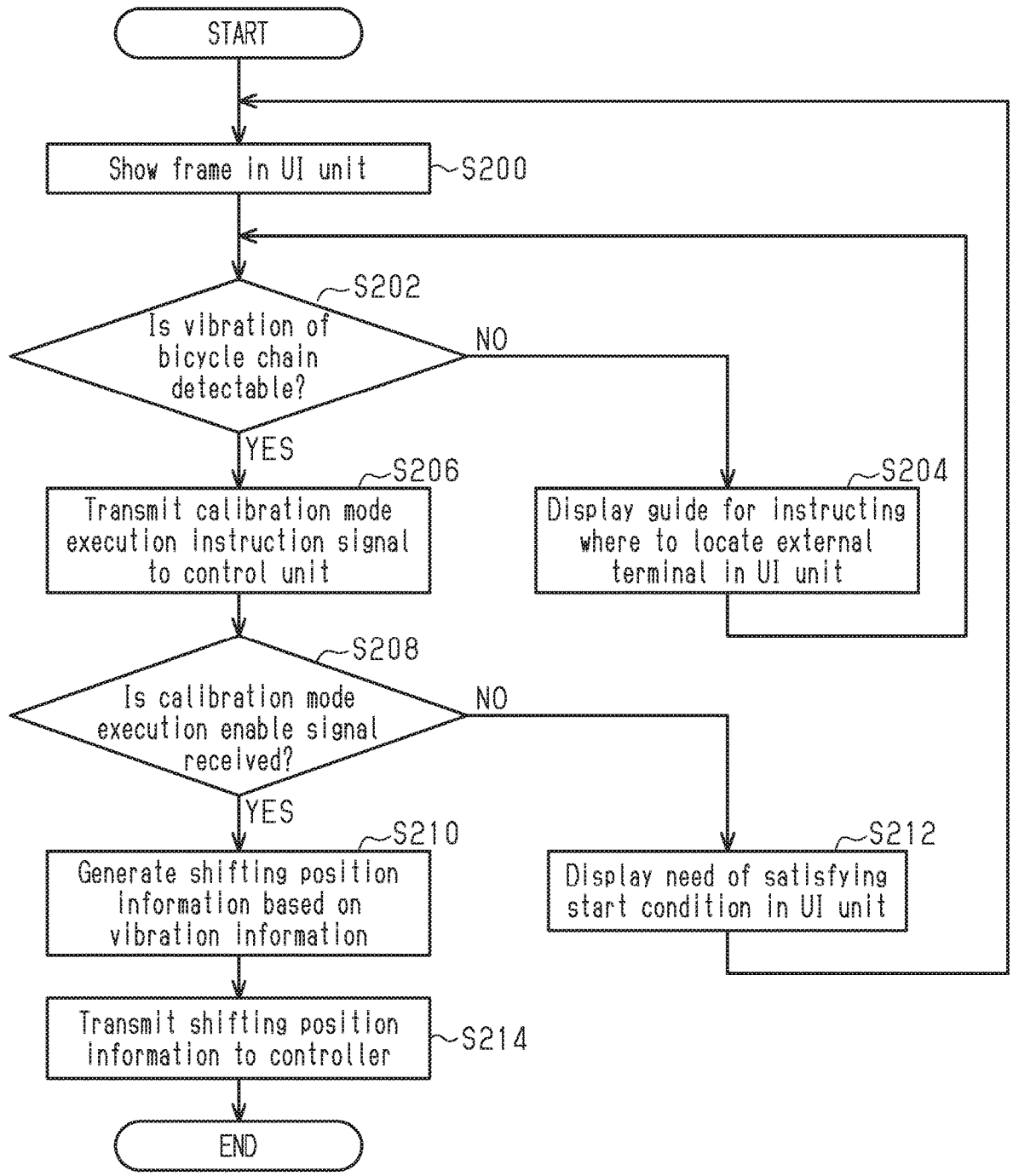
FIG. 7 is a flowchart showing one example of an action of an external terminal in the calibration mode.

One example of actions of the electronic controller 110 and the external terminal 200 in the calibration mode will now be described with reference to FIGS. 5 to 7. The calibration mode is started in a case where the user selects the calibration mode as the drive mode of the assist mechanism C.

In step S100, the electronic controller 110 determines whether or not a calibration mode execution instruction signal is received. If step S100 makes the affirmative determination, that is, the calibration mode execution instruction signal is received, then step S102 is executed. If step S100 makes the negative determination, that is, the calibration mode execution instruction signal is not received, then step S100 is repeatedly executed. The calibration mode execution instruction signal is a signal that is transmitted from the external terminal 200 and includes vibration information from the microphone 310 of the vibration detector 300.

In step S102, the electronic controller 110 determines whether or not the level of noise is less than a predetermined level based on the vibration information from the microphone 310 of the vibration detector 300. If step S102 makes the affirmative determination, that is, the noise is less than the predetermined level, then step S104 is executed. If step S102 makes the negative determination, that is, the noise is greater than or equal to the predetermined level, then the calibration mode is ended.

The external terminal 200 can execute step S102. More specifically, the external terminal 200 can determine whether or not the level of noise is less than the predetermined level based on the vibration information from the microphone 310 of the vibration detector 300. In this case, if the noise is less than the predetermined level, then the external terminal 200 transmits the calibration mode execution instruction signal, which will be descried later, to the electronic control unit 100. If the noise is greater than or equal to the predetermined level, then the external terminal 200 does not transmit the calibration mode execution instruction signal, which will be described later, to the electronic control unit 100.

In step S104, the electronic controller 110 determines whether or not the bicycle A is not traveling based on information related to the speed of the bicycle A from the speed sensor 130. If step S104 makes the affirmative determination, that is, the speed of the bicycle A is 0 km/h, then step S106 is executed. If step S104 makes the negative determination, that is, the speed of the bicycle A is greater than 0 km/h, then the calibration mode is ended.

In step S106, the electronic controller 110 determines whether or not the rear wheel A4 is out of contact with the ground based on the bicycle inclination angle received from the inclination sensor E5. If the bicycle inclination angle is greater than zero degrees, then the rear wheel A4 is determined to be out of contact with the ground. If the bicycle inclination angle is zero degrees, then the rear wheel A4 is determined to be in contact with the ground. If step S106 makes the affirmative determination, that is, the rear wheel A4 is out of contact with the ground, then step S108 is executed. If step S106 makes the negative determination, that is, the rear wheel A4 is in contact with the ground, then the calibration mode is ended.

In step S106, whether both of the front wheel A3 and the rear wheel A4 are out of contact with the ground or not can be determined. In this case, the determination of step S106 can be performed based on information from a known pressure sensor, and step S108, which will be described later, is omitted.

In step S108, the electronic controller 110 determines whether or not the bicycle inclination angle is greater than a predetermined angle. The predetermined angle is an angle that allows for determination that the bicycle A is unable to travel even if the second electric actuator C1 is driven because the rear wheel A4 is adequately separated from the ground surface. If step S108 makes the affirmative determination, that is, the bicycle inclination angle is greater than the predetermined angle, then step S110 is executed. If step S108 makes the negative determination, that is, the bicycle inclination angle is less than or equal to the predetermined angle, then the calibration mode is ended.

In step S110, the electronic controller 110 transmits a calibration mode execution enable signal to the external terminal 200. In step S112, the electronic controller 110 drives the second electric actuator C1. Thus, the bicycle chain B4 is rotated.

In step S114, the electronic controller 110 determines whether or not the movable portion E2 is located at the first position based on the detection signal of the position sensor E6. If step S114 makes the affirmative determination, that is, the movable portion E2 is located at the first position, then step S118 is executed. If step S114 makes the negative determination, that is, the movable portion E2 is not located at the first position, then step S116 is executed.

In step S116, the electronic controller 110 drives the first electric actuator E4 to move the movable portion E2 to the first position.

In step S118, the electronic controller 110 drives the first electric actuator E4 to move the movable portion E2 from the first position to the second position. In step S118, the electronic controller 110 continuously moves the movable portion E2 from the first position to the second position at a fixed speed that is set in advance. In step S118, the electronic controller 110 continuously moves the movable portion E2 from the first position to the second position while actuating the second electric actuator C1. While the electronic controller 110 is executing step S118, the external terminal 200 collects vibration information detected by the microphone 310 of the vibration detector 300, which will be described later.

In step S120, the electronic controller 110 drives the first electric actuator E4 to move the movable portion E2 from the second position to the first position. While the electronic controller 110 is executing step S120, the external terminal 200 collects the vibration information detected by the microphone 310 of the vibration detector 300, which will be described later. Step S120 can be omitted.

In step S122, the electronic controller 110 determines whether or not shifting position information is received. If step S122 makes the affirmative determination, that is, the shifting position information is received, then step S124 is executed. If step S122 makes the negative determination, that is, the shifting position information is not received, then step S122 is executed.

In step S124, the electronic controller 110 sets the plurality of shifting positions related to the shifting device E. More specifically, the electronic controller 110 sets the shifting position corresponding to each sprocket B31 of the second bicycle sprocket assembly B3 based on the shifting position information.

In step S126, the electronic controller 110 stores the plurality of shifting positions related to the shifting device E in the memory 120. More specifically, the memory 120 stores the shifting position corresponding to each of the sprockets B31 of the second bicycle sprocket assembly B3 and set based on the shifting position information. After step S126 is executed, in step S128, the electronic controller 110 deactuates the first electric actuator E4 and the second electric actuator C1 and ends the calibration mode.

Figure 8:
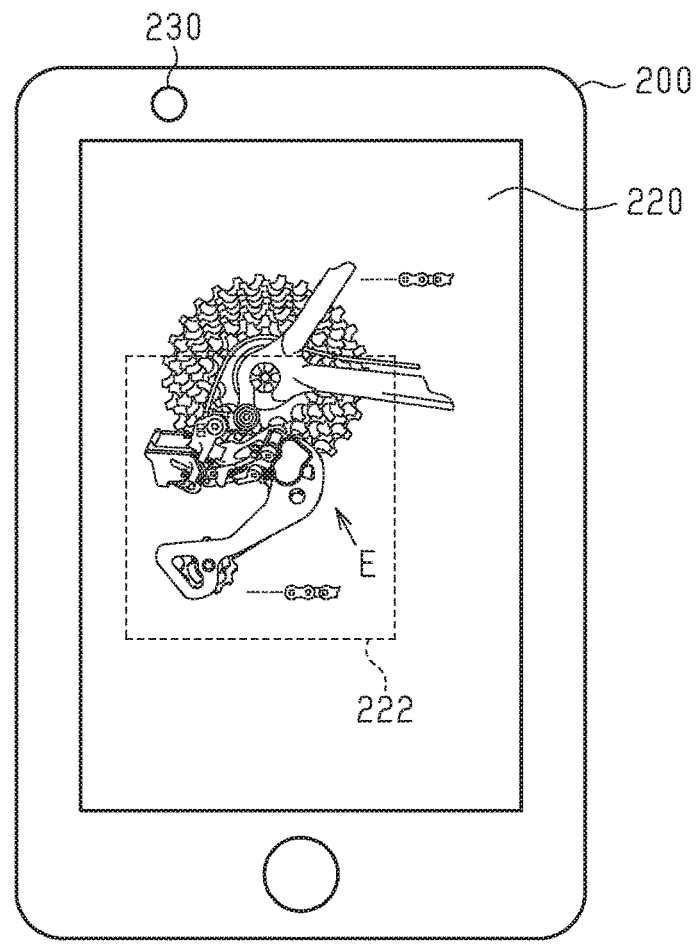
FIG. 8 is a schematic diagram of a guide function.

In step S200, as shown in FIG. 8, the external terminal 200 shows a frame 222 on an image that is captured by the image capturing unit 230 and displayed in the UI unit 220. The user places the external terminal 200 so that the contour of the shifting device E is located inside the frame 222.

In step S202, the external terminal 200 determines whether or not the vibration detector 300 can detect vibration of the bicycle chain B4. If step S202 makes the affirmative determination, that is, the contour of the shifting device E is located inside the frame 222, then step S206 is executed. If step S202 makes the negative determination, that is, the contour of the shifting device E is not located inside the frame 222, then step S204 is executed.

In step S204, the external terminal 200 displays a guide for instructing where to locate the external terminal 200 in the UI unit 220. In step S204, the external terminal 200 displays, in the UI unit 220, a guide for instructing the external terminal 200 to be moved closer to the shifting device E or a guide for instructing the external terminal 200 to be moved away from the shifting device E so that the contour of the shifting device E is located inside the frame 222. Then, step S202 is executed.

In step S206, the external terminal 200 transmits the calibration mode execution instruction signal to the electronic control unit 100.

In step S208, the external terminal 200 determines whether or not the calibration mode execution enable signal is received. If step S208 makes the affirmative determination, that is, the calibration mode execution enable signal is received, then step S210 is executed. If step S208 makes the negative determination, that is, the calibration mode execution enable signal is not received, then step S212 is executed.

In step S212, the external terminal 200 displays, in the UI unit 220, a guide indicating that non-satisfied ones of the conditions of steps S102 to S108 (refer to FIG. 5) (hereafter, referred to as "the start conditions") need to be satisfied. Then, step S200 is executed.

In step S210, the external terminal 200 generates the shifting position information, which includes the shifting position corresponding to each sprocket B31 of the second bicycle sprocket assembly B3, based on the vibration information collected while the movable portion E2 is moving in the order of the first position to the second position and then the first position. In a case where step S120 (refer to FIG. 6) is omitted, the external terminal 200 generates the shifting position information based on the vibration information collected while the movable portion E2 is moving from the first position to the second position. In step S214, the external terminal 200 transmits the shifting position information to the electronic controller 110 and ends the calibration mode.

Alternatively, the electronic controller 110 can execute step S210. In this case, after step S206 is completed, the external terminal 200 omits step S208 and transmits the collected vibration information to the electronic controller 110. Then, the calibration mode is ended.

Figure 9:
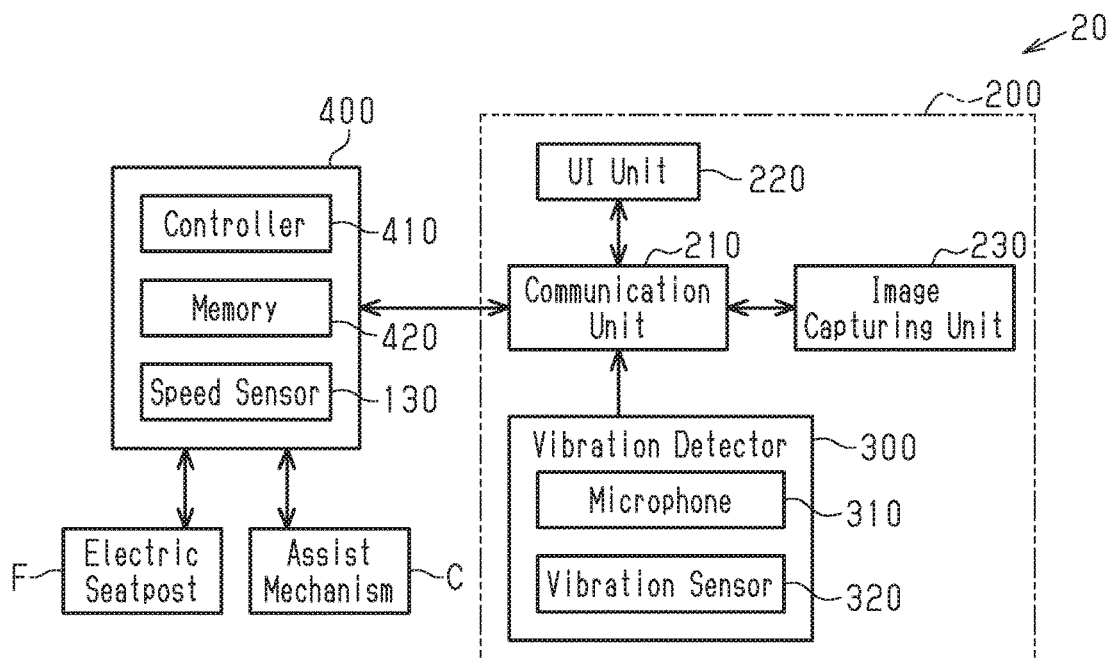
FIG. 9 is a block diagram showing the configuration of the bicycle seatpost calibration system.

Instead of or in addition to the bicycle shifting device calibration system 10, a bicycle seatpost calibration system 20 that is shown in FIG. 9 is applicable to the bicycle A, which is shown in FIG. 1.

The bicycle seatpost calibration system 20 includes an electronic control unit 400 that includes an electronic controller 410 and a memory 420. The electronic controller 410 sets at least one actuation parameter related to the electric seatpost F based on vibration information that is output from the vibration detector 300 in a case where a movable portion of the electric seatpost F is moved from a first position to a second position that differs from the first position. In a first example, the electronic controller 410 sets one actuation parameter related to the electric seatpost F. In a second example, the electronic controller 410 sets a plurality of actuation parameters related to the electric seatpost F. The memory 420 stores the actuation parameters that are set by the electronic controller 410.

Figure 10:
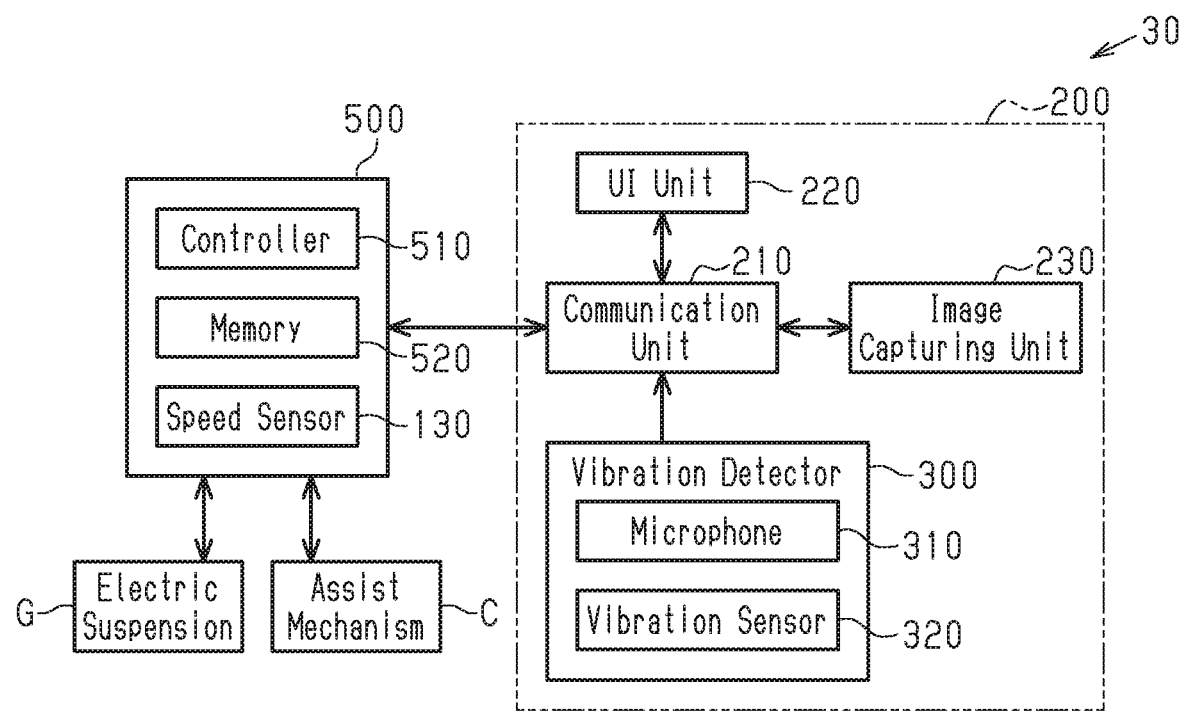
FIG. 10 is a block diagram showing the configuration the bicycle suspension calibration system.

Instead of or in addition to the bicycle shifting device calibration system 10 and the bicycle seatpost calibration system 20, a bicycle suspension calibration system 30 that is shown in FIG. 10 is applicable to the bicycle A, which is shown in FIG. 1.

The bicycle suspension calibration system 30 includes an electronic control unit 500 that includes an electronic controller 510 and a memory 520. The electronic controller 510 sets at least one actuation parameter related to the electric suspension G based on vibration information that is output from the vibration detector 300 in a case where a movable portion of the electric suspension G is moved from a first position to a second position that differs from the first position. In a first example, the electronic controller 510 sets one actuation parameter related to the electric suspension G. In a second example, the electronic controller 510 sets a plurality of actuation parameters related to the electric suspension G. The memory 520 stores the actuation parameters that are set by the electronic controller 510.

What is claimed is:

1. A bicycle shifting device calibration system comprising:
   an electronic controller configured to execute a calibration mode in response to a calibration mode execution instruction signal, the electronic controller executing the calibration mode by activating an electric actuator to actuate a movable portion of a shifting device and setting a plurality of shifting positions related to the shifting device based on vibration information that is output from a vibration detector when the movable portion of the shifting device is continuously moved from a first position to a second position, which differs from the first position, in a state where the shifting device is coupled to a bicycle; and
   a memory that stores the plurality of shifting positions set by the electronic controller, the plurality of shifting positions corresponding to a plurality of different sprockets.

2. The bicycle shifting device calibration system according to claim 1, further comprising
   the vibration detector that detects a vibration when the movable portion of the shifting device is actuated.

3. The bicycle shifting device calibration system according to claim 2, wherein
   the vibration detector detects vibration of air.

4. The bicycle shifting device calibration system according to claim 3, wherein
   the vibration detector includes a microphone.

5. The bicycle shifting device calibration system according to claim 2, wherein
the vibration detector directly or indirectly detects at least one of a vibration of a bicycle body to which the shifting device is coupled, a vibration of a bicycle sprocket assembly, a vibration of a bicycle chain that runs around the bicycle sprocket assembly, and a vibration of the shifting device.

6. The bicycle shifting device calibration system according to claim 2, wherein
the vibration detector includes a vibration sensor.

7. The bicycle shifting device calibration system according to claim 1, wherein
the electronic controller sets the shifting positions of five or more stages related to the shifting device based on the vibration information.

8. The bicycle shifting device calibration system according to claim 7, wherein
the electronic controller sets the shifting positions of ten or more stages related to the shifting device based on the vibration information.

9. The bicycle shifting device calibration system according to claim 1, further comprising
the shifting device that is a derailleur that changes an engagement state between a bicycle sprocket assembly and a bicycle chain.

10. The bicycle shifting device calibration system according to claim 9, further comprising
the bicycle sprocket assembly that further includes a first sprocket that has a smallest outer diameter and a second sprocket that has a largest outer diameter, and
the plurality of shifting positions includes a first shifting position that corresponds to the first sprocket and a second shifting position that corresponds to the second sprocket.

11. The bicycle shifting device calibration system according to claim 10, wherein
the first position corresponds to one of the first shifting position and the second shifting position, and
the second position corresponds to the other one of the first shifting position and the second shifting position.

12. The bicycle shifting device calibration system according to claim 10, wherein
the first shifting position and the second shifting position are spaced apart by a distance of 10 mm or greater in an axial direction that is parallel to a rotational center axis of the bicycle sprocket assembly.

13. The bicycle shifting device calibration system according to claim 10, wherein
the first shifting position and the second shifting position are spaced apart by a distance of 50 mm or less in an axial direction that is parallel to a rotational center axis of the bicycle sprocket assembly.

14. The bicycle shifting device calibration system according to claim 1, further comprising
an external terminal that includes the electronic controller.

15. The bicycle shifting device calibration system according to claim 14, wherein
the external terminal has a guide function that guides a range in which the vibration detector is able to detect vibration.

16. The bicycle shifting device calibration system according to claim 1, further comprising
an external terminal that includes the vibration detector.

17. The bicycle shifting device calibration system according to claim 16, wherein
the vibration detector connects and communicates with a vibration sensor that directly or indirectly detects at least one of a vibration of a bicycle body to which the shifting device is coupled, a vibration of a bicycle sprocket assembly, a vibration of a bicycle chain that runs around the bicycle sprocket assembly, and a vibration of the shifting device.

18. The bicycle shifting device calibration system according to claim 1, wherein
the electric actuator is a first electric actuator, and
the shifting device includes the first electric actuator that actuates the movable portion.

19. The bicycle shifting device calibration system according to claim 1, further comprising
a second electric actuator that moves a bicycle chain, which transmits drive power to a rear wheel of the bicycle.

20. The bicycle shifting device calibration system according to claim 19, wherein
the electronic controller actuates the second electric actuator while executing the calibration mode.

21. The bicycle shifting device calibration system according to claim 20, wherein
the electronic controller continuously moves the movable portion from the first position to the second position and sets the plurality of shifting positions based on the vibration information while actuating the second electric actuator.

22. A bicycle shifting device calibration system comprising:
an electronic controller configured to execute a calibration mode in response to a calibration mode execution instruction signal, the electronic controller executing the calibration mode by activating an electric actuator to actuate a movable portion of a shifting device and setting a plurality of shifting positions related to the shifting device based on vibration information that is output from a vibration detector when the movable portion of the shifting device is continuously moved from a first position to a second position, which differs from the first position, in a state where the shifting device is coupled to a bicycle; and
a memory that stores the plurality of shifting positions set by the electronic controller;
the electronic controller actuates a second electric actuator while executing the calibration mode, the second electric actuator moving a bicycle chain which transmits drive power to a rear wheel of the bicycle;
the electronic controller continuously moves the movable portion from the first position to the second position and sets the plurality of shifting positions based on the vibration information while actuating the second electric actuator; and
the electronic controller determines whether the plurality of shifting positions are set, and deactivates the second electric actuator after the plurality of shifting positions are set.

23. The bicycle shifting device calibration system according to claim 20, wherein
the electronic controller determines whether the bicycle is traveling based on feedback from at least one sensor, and does not actuate the second electric actuator when the bicycle is determined to be not traveling and the calibration mode is not executed.

24. A bicycle shifting device calibration system comprising:
an electronic controller configured to execute a calibration mode in response to a calibration mode execution instruction signal, the electronic controller executing the calibration mode by activating an electric actuator to actuate a movable portion of a shifting device and setting a plurality of shifting positions related to the shifting device based on vibration information that is output from a vibration detector when the movable portion of the shifting device is continuously moved from a first position to a second position, which differs from the first position, in a state where the shifting device is coupled to a bicycle; and a memory that stores the plurality of shifting positions set by the electronic controller; and the electronic controller determines whether a rear wheel is in contact with the ground based on feedback from at least one sensor, and does not execute the calibration mode when the rear wheel of the bicycle is determined to be in contact with the ground.

25. A bicycle shifting device calibration system comprising:

an electronic controller configured to execute a calibration mode in response to a calibration mode execution instruction signal, the electronic controller executing the calibration mode by activating an electric actuator to actuate a movable portion of a shifting device and setting a plurality of shifting positions related to the shifting device based on vibration information that is output from a vibration detector when the movable portion of the shifting device is continuously moved from a first position to a second position, which differs from the first position, in a state where the shifting device is coupled to a bicycle; and a memory that stores the plurality of shifting positions set by the electronic controller; and the electronic controller determines whether an inclination angle of a bicycle body with respect to a pitch axis is less than or equal to a predetermined angle based on feedback from at least one sensor, and does not execute the calibration mode when the inclination angle of the bicycle body with respect to the pitch axis is determined to be less than or equal to the predetermined angle.

26. The bicycle shifting device calibration system according to claim 1, wherein the electronic controller does not execute the calibration mode when a level of noise related to vibration detected by the vibration detector is greater than or equal to a fixed value.

27. The bicycle shifting device calibration system according to claim 1, wherein the electronic controller sets the plurality of shifting positions based on the vibration information that is output from the vibration detector when the movable portion is continuously moved in order from the first position to the second position and then the first position.

28. The bicycle shifting device calibration system according to claim 1, wherein the electronic controller continuously moves the movable portion from the first position to the second position at a fixed speed that is set in advance.

29. A bicycle shifting device calibration system comprising:

an electronic controller configured to execute a calibration mode in a first state by setting a plurality of shifting positions related to a shifting device based on vibration information that is output from a vibration detector when a movable portion of the shifting device is continuously moved from a first position to a second position, which differs from the first position, when the shifting device is coupled to a bicycle; and a memory that stores the plurality of shifting positions set by the electronic controller, the plurality of shifting positions corresponding to a plurality of different sprockets.

30. The bicycle shifting device calibration system according to claim 29, wherein the first state includes a state where the bicycle is not traveling.

* * * * *